United States Patent
Pol et al.

(10) Patent No.: US 12,176,525 B2
(45) Date of Patent: Dec. 24, 2024

(54) SILICON-CARBON COMPOSITE ANODES FOR LITHIUM-ION BATTERIES AND METHOD OF MAKING THE SAME

(71) Applicant: Purdue Research Foundation, West Lafayette, IN (US)

(72) Inventors: Vilas Ganpat Pol, West Lafayette, IN (US); Jialiang Tang, Dallas, TX (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/028,163

(22) Filed: Jul. 5, 2018

(65) Prior Publication Data

US 2019/0013515 A1    Jan. 10, 2019

Related U.S. Application Data

(60) Provisional application No. 62/530,643, filed on Jul. 10, 2017.

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/133* (2013.01);
(Continued)

(58) Field of Classification Search
CPC ........ H01M 4/36; H01M 4/133; H01M 4/134; H01M 4/1393; H01M 4/1395; H01M 4/38; H01M 4/587
See application file for complete search history.

(56) References Cited

U.S. PATENT DOCUMENTS

| | | | |
|---|---|---|---|
| 2007/0092796 A1* | 4/2007 | Matsuda | H01M 4/386 429/217 |
| 2011/0171502 A1* | 7/2011 | Kottenstette | H01M 4/525 429/49 |

(Continued)

FOREIGN PATENT DOCUMENTS

JP    2000348726 A  * 12/2000  .............. C01B 32/21

OTHER PUBLICATIONS

Machine Translation of: JP 2000/348726 A, Ohzeki et al., Dec. 15, 2000.*

(Continued)

*Primary Examiner* — Kenneth J Douyette
(74) *Attorney, Agent, or Firm* — Purdue Research Foundation

(57) ABSTRACT

An anode for use in lithium-ion battery. The anode contains silicon nanoparticles, a coating of carbon on the silicon nanoparticles, and a polymeric binder. A method of making an anode for use in lithium-ion battery. The method includes the steps of mixing the silicon nanoparticles with wheat flour to form a homogenized mixture of wheat flour and silicon nanoparticles, heating the homogenized mixture to form a silicon-carbon composite comprising a coating of carbon on the silicon nanoparticles which is then heated along with an additional quantity of wheat flour in an inert atmosphere resulting in an anode comprising silicon-carbon composite with a double coating on the silicon nanoparticles. The silicon-carbon composite is then mixed with a polymeric binder, resulting in an anode for use in a lithium battery. An electrochemical cell with an anode containing silicon nanoparticles, a coating of carbon on the silicon nanoparticles; and a polymeric binder.

13 Claims, 10 Drawing Sheets

(51) Int. Cl.
　　　H01M 4/13　　　(2010.01)
　　　H01M 4/133　　(2010.01)
　　　H01M 4/134　　(2010.01)
　　　H01M 4/1393　(2010.01)
　　　H01M 4/1395　(2010.01)
　　　H01M 4/38　　　(2006.01)
　　　H01M 4/58　　　(2010.01)
　　　H01M 4/587　　(2010.01)
　　　H01M 4/62　　　(2006.01)
　　　H01M 10/0525　(2010.01)
　　　H01M 4/02　　　(2006.01)

(52) U.S. Cl.
　　　CPC ......... *H01M 4/134* (2013.01); *H01M 4/1393* (2013.01); *H01M 4/1395* (2013.01); *H01M 4/364* (2013.01); *H01M 4/386* (2013.01); *H01M 4/587* (2013.01); *H01M 4/622* (2013.01); *H01M 10/0525* (2013.01); *H01M 2004/027* (2013.01)

(56) References Cited

U.S. PATENT DOCUMENTS

| | | | | |
|---|---|---|---|---|
| 2011/0281180 | A1* | 11/2011 | Kim | H01M 4/134 |
| | | | | 429/338 |
| 2012/0141881 | A1* | 6/2012 | Geier | H01M 4/40 |
| | | | | 429/231.95 |
| 2012/0168688 | A1* | 7/2012 | Nakayama | H01M 4/133 |
| | | | | 252/511 |
| 2014/0038042 | A1* | 2/2014 | Rios | H01M 4/587 |
| | | | | 252/502 |
| 2015/0099187 | A1* | 4/2015 | Cui | H01M 4/366 |
| | | | | 429/209 |
| 2016/0006024 | A1* | 1/2016 | Xiao | H01M 4/625 |
| | | | | 429/332 |
| 2016/0049656 | A1* | 2/2016 | Laicer | H01M 4/0471 |
| | | | | 429/213 |

OTHER PUBLICATIONS

S.H. Ng et al., "Amorphous Carbon-Coated Silicon Nanocomposites: A Low-Temperature Synthesis via Spray Pyrolysis and Their Application as High-Capacity Anodes for Lithium-Ion Batteries", J. Phys. Chem. C. 111 (2007), pp. 11131-11138. doi:10.1021/jp072778d.

N. Liu et al., "Rice husks as a sustainable source of nanostructured silicon for high performance Li-ion battery anodes", Sci. Rep. 3 (2013), pp. 1-7. doi:10.1038/srep01919.

Z. Lu et al., "Nonfilling Carbon Coating of Porous Silicon Micrometer-Sized Particles for High-Performance Lithium Battery Anodes", ACS Nano. 9 (2015), pp. 2540-2547. doi: 10.1021/nn505410q.

J.K. Lee et al., "Silicon nanoparticles-graphene paper composites for Li ion battery anodes", Chem. Commun. 46 (2010), pp. 2025-2027. doi:10.1039/b919738a.

K. Kierzek et al., "Towards the realistic silicon/carbon composite for Li-ion secondary battery anode", J. Appl. Electrochem. (2015), pp. 1-10. doi:10.1007/s10800-014-0754-3.

L.Y. Yang et al., "Dual yolk-shell structure of carbon and silica-coated silicon for high-performance lithium-ion batteries", Sci. Rep. 5 (2015), pp. 1-9, doi:10.1038/srep10908.

J. Liu et al., "Mechanically and Chemically Robust Sandwich-Structured C@Si@C Nanotube Array Li-Ion Battery Anodes", ACS Nano. (2015), pp. 1985-1994. doi:10.1021/nn507003z.

* cited by examiner

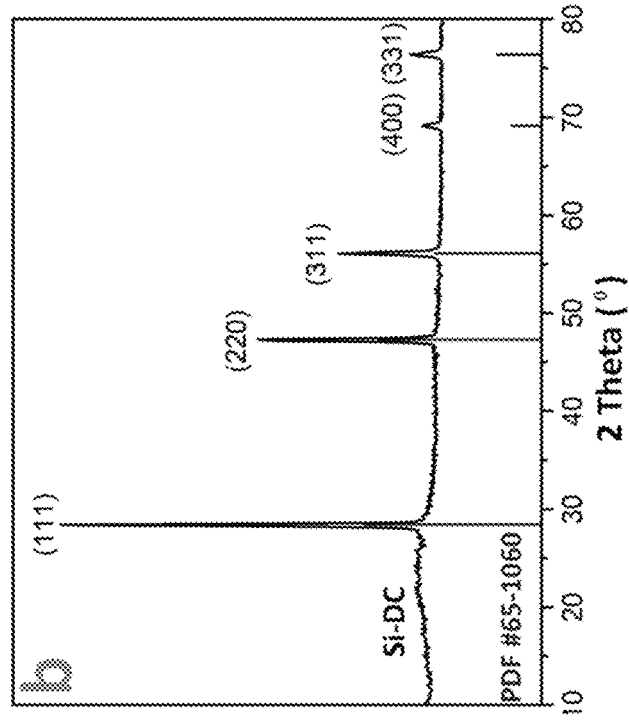
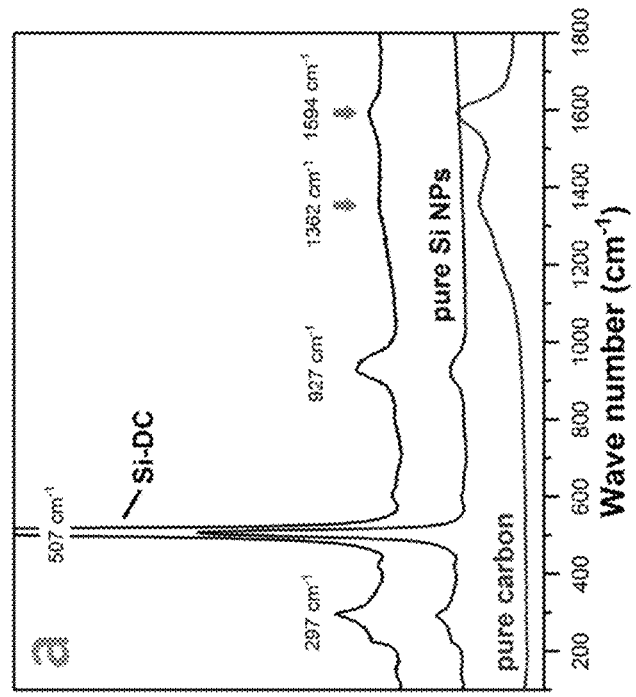
FIGS. 4A
FIGS. 4B

SILICON-CARBON COMPOSITE ANODES FOR LITHIUM-ION BATTERIES AND METHOD OF MAKING THE SAME

CROSS REFERENCE TO RELATED APPLICATIONS

The present U.S. patent application is related to and claims the priority benefit of U.S. Provisional Patent Application Ser. No. 62/530,643 filed Jul. 10, 2017, the contents of which are hereby incorporated by reference in their entirety into the present disclosure.

TECHNICAL FIELD

This disclosure relates to anodes for lithium ion batteries, especially rechargeable lithium-ion batteries, wherein the anodes possess enhanced cycling stability.

BACKGROUND

This section introduces aspects that may help facilitate a better understanding of the disclosure. Accordingly, these statements are to be read in this light and are not to be understood as admissions about what is or is not prior art.

Silicon has been popularly studied as a next-generation anode material for rechargeable lithium-ion batteries (LIBs), particularly for both high-voltage and lithium-sulfur systems. Performance advantages of silicon include a large theoretical gravimetric capacity of ~3600 mAh $g^{-1}$ (based upon complete phase conversion of Si to $Li_{3.75}Si$) and relatively high anodic lithiation potential of ca. 0.2 V (vs. $Li/Li^+$). In addition, the low toxicity and natural abundance of silicon and its precursors provide an additional incentive for rechargeable energy storage applications. However, the technical challenges of practical silicon anodes include: (1) electrode pulverization due to large particulate volume changes (up to 300%-vol.) during cycling, resulting in the loss of electric contact among current collector, binder, or carbon additives; and (2) short cycle life and stability due to excessive and unstable growth of the solid electrolyte interphase (SEI).

To address the inherent lithium-induced stresses during silicon lithiation and delithiation, much research effort has focused on developing novel silicon based nanostructures such as nanoparticles, nanowires, nanotubes, and nanosheets. Compared to the bulk silicon particle, these nanostructures exhibit improved surface-to-volume ratios that permit greater mechanical resistance to excessive volume changes during cycling. However, while these materials also demonstrate greater reversible gravimetric capacity across various cycling rates, the greater specific surface areas enhance the growth of SEI. Subsequent studies of these nanostructures involved incorporation of silicon into a secondary matrix (e.g. $Al_2O_3$[9], polypyrrole-Fe complexes, lithium silicate/lithium titanate coatings, and carbon to reduce effective surface area, increase electronic conductivity, and/or improve mechanical resilience.

Among these composite materials, those utilizing carbon have been extensively studied due to a variety of benefits including: excellent conductivity, high mechanical strength, lithiation ability, facile preparation, and low production cost. Researchers demonstrated a sandwich-structured C—Si—C nanotube array that delivers 1235 mAh $g^{-1}$ of Si at a 2C cycling rate with coulombic efficiency >98%. In 2016, some researchers prepared a dual yolk-shell structure of carbon and silica-coated silicon nanoparticles that delivers a stable capacity of 956 $mAhg^{-1}$ after 430 cycles with 83% capacity retention. Researchers also synthesized nanostructured Silicon secondary clusters (nano-Si SC) via mechanical pressing/ball milling/coating with a resorcinol-formaldehyde-derived carbon; the prepared nano-Si SC anode delivered average specific capacity of 1250 mAh $g^{-1}$ at 1C for 1400 cycles with 95% capacity retention. While these materials exhibit interesting nanostructures and promising electrochemistry, the synthesis methods are often complicated, unscalable, toxic, and expensive. More recent research efforts have pursued greener, lower-cost synthesis routes that utilize pitch, sugar, citric acid, various biomasses, and industrial waste as sustainable carbon precursors. However, these methods do not lend themselves to desired porous architectures in the anode structure.

Thus, there exists an unmet need for carbon/silicon composites possessing enhanced cycling stability but produced by methods that are simpler, scalable and non-toxic, and capable of resulting in porous architecture for the anodes for increased efficiency.

SUMMARY

An anode for use in lithium-ion battery is disclosed. The anode contains silicon nanoparticles, one or more coatings of carbon on the silicon nanoparticles, and a polymeric binder.

A method of making an anode for use in lithium-ion battery is disclosed. The method includes the steps of providing silicon nanoparticles, mixing the silicon nanoparticles with wheat flour to form a homogenized mixture of wheat flour and silicon nanoparticles, heating the homogenized mixture of wheat flour and silicon nanoparticles for a period of time in an inert atmosphere to form a silicon-carbon composite comprising a coating of carbon on the silicon nanoparticles, heating the silicon-carbon composite comprising a coating of carbon on the silicon nanoparticles along with an additional quantity of wheat flour in an inert atmosphere thereby forming an additional coating of carbon resulting in an anode comprising silicon-carbon composite with a double coating on the silicon nanoparticles; and mixing the silicon-carbon composite with a double coating of carbon on the silicon nanoparticles with a polymeric binder, resulting in an anode for use in a lithium battery.

An electrochemical cell is disclosed. The electrochemical cell contains an anode, a cathode and an electrolyte, wherein the anode comprises silicon nanoparticles, one or more coatings of carbon on the silicon nanoparticles; and a polymeric binder.

BRIEF DESCRIPTION OF DRAWINGS

Some of the figures shown herein may include dimensions. Further, some of the figures shown herein may have been created from scaled drawings or from photographs that are scalable. It is understood that such dimensions, or the relative scaling within a figure are by way of example, and not to be construed as limiting.

FIGS. 4A and 4B show Raman spectra and XRD spectra respectively of Si-DC samples of this disclosure.

DETAILED DESCRIPTION

Figure 1:
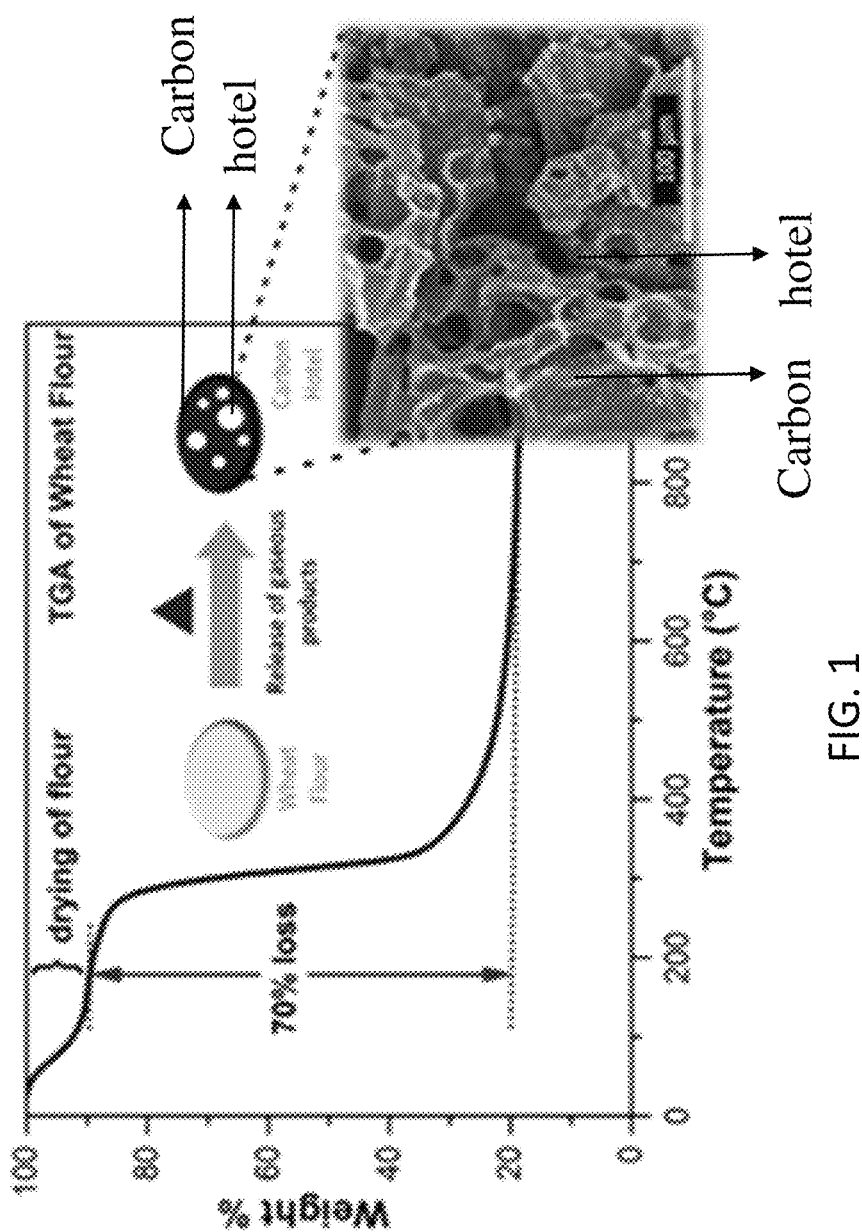
FIG. 1 shows Thermogravimetric Analysis (TGA) and SEM image illustrating the mechanism of flour-derived carbon formation.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

In this disclosure, preparation of micron-regime silicon-carbon composites via a practical, facile encapsulation of premade Si nanoparticles (Si-NPs) using commercial white wheat flour as the carbon precursor is described. The choice of wheat flour is primarily motivated by its wide availability and low cost; while the composite size is kept in the micron domain for practical applications. In the studies leading to this disclosure, this silicon-carbon composite of this disclosure has demonstrated good cycling stability without significant degradation during prolonged cycling.

Synthesis of Si-carbon Composite: In experiments leading to this disclosure, sub-100 nm Silicon nanoparticles (Si-NPs, obtained from Sigma Aldrich) and commercial white wheat flour (Brand: Ashirwad) were utilized as received without further purification. In a typical procedure, 450 mg of Si-NPs were ball-milled with 1200 mg of wheat flour for 30 mins. The milled composite was then transferred into a high temperature tube furnace and heated under inert atmosphere (99.997% Argon, Indiana Oxygen Co.) to 500° C. at a rate of 1° C./min and dwell time of 30 minutes. The combined milling and heating process produces a Si—C composite with ca. 56%-wt. Si-NPs. Using a mortar and pestle, the obtained Si—C composite was triturated and homogeneously mixed with 1725 mg of untreated wheat flour. The mixed composite was then transferred into a high temperature tube furnace and heated under argon atmosphere and heated to 500° C. with a heating rate of 10° C./min and dwell time of 2 hours. The final product contains ca. 32.82 wt % Si-NPs loading, and is identified as "Si-DC" (for double coating) in the text. Si-NPs loadings were calculated based on the calculated change in mass before and after each pyrolytic heat treatment.

Material characterization: FEI Nova 200 NanoLab Dual-Beam TM-SEM/FIB was utilized to collect scanning electron microscopy (SEM) images of the Si—C samples. Thermo Scientific DXR Raman Microscope equipped with 532-nm laser (3 mW) was employed to record Raman spectrum of the powder sample mounted on a glass slide. Rigaku SmartLab XRD with a Cu Kα radiation source was used to collect X-ray powder diffraction pattern of the sample; samples were scanned from 10° to 80° at a rate of 5° per minute. TA DST Q600 thermal gravimetric analyzer was used to study the thermal decomposition of the wheat flour and Si/flour mixture from 30° C. to 1000° C. at 10° C./min under constant helium flow (100 ml/s).

Electrochemical Testing: To prepare electrodes for lithium ion batteries, an additive slurry was prepared with 3%-wt. Styrene butadiene rubber (SBR), 7%-wt. carboxymethyl cellulose (CMC), 20%-wt. carbon black (Super P Li, Timcal Co.), and a solvent of deionized water. The additive slurry was homogenized using a conditioning mixer (AR100, Thinky) at 8000 rpm. After the initial homogenization, 70%-wt. Si—C composite was added to the slurry and homogenized for another 10 mins. The homogenized mixture was casted onto a copper foil using a doctor blade technique. The laminate was dried at 80° C. overnight in a vacuum oven and then punched into 12 mm diameter electrodes.

Coin cells (designated as 2032 in our experiments) were constructed using a porous polypropylene (Celgard 2500) separator and lithium metal reference electrode. The utilized electrolyte is composed of 1.0 M lithium hexaflorophosphate (Sigma Aldrich) and along with 3%-vol. fluoroethylene carbonate (FEC) dissolved in an equivolume solvent of ethylene carbonate (EC), diethyl carbonate (DEC), and dimethyl carbonate (DMC). Battery cells were cycled galvanostatically at various charge rates with the voltage range 0.01-2 V (vs. Li/Li+) using an Arbin BT-2000 Galvanostat. Current densities were scaled according to the assumption of 4200 mAh g−1 of silicon per hour).Electrochemical impedance spectroscopy (EIS) measurements were carried out on Gamry Reference 600 Electrochemical Workstation. The impedance data on the as prepared electrodes in Li half cells was collected at 0.1V during each charge and discharge cycles; AC voltage perturbation with amplitude of 10 mV over frequency range of 1 MHz to 0.01 Hz was used. Cyclic voltammetry (CV) of the cell was collected at a scan rate of 1 mV/s within voltage window of 10 mV-2V.

Similarly, a comparison laminate (henceforth referred as "Si-Control") containing SBR, CMC, Super P Li, and Si-NPs was prepared using the above procedure (with a modified mass percentages of 3%, 7%, 79%, and 21% respectively. Additional electrochemical testing was performed as previously outlined. The total silicon loading was maintained to be constant for both Si-Control and Si-DC electrodes.

Post-mortem electrode characterization was performed to observe changes to the electrode surface due to electrochemical cycling. Upon completion of electrochemical testing, battery cells were opened under inert atmosphere. The extracted electrodes were washed with dimethyl carbonate (DMC) to remove residual adsorbed electrolyte solution. The electrodes were dried under vacuum for 1 hour. The subsequent characterization was performed using SEM imaging.

The carbon substrate utilized in the studied carbon-silicon composite is the product of white wheat flour under pyrolytic heat treatment. When heated under inert atmosphere, wheat flour decomposes due to a number of decomposition reactions, with an overall reaction $(C_6H_{10}O_5)_n = H_2O_{(g)} + C_{(s)} +$ other gaseous products. FIG. 1 shows Thermogravimetric Analysis (TGA) and SEM image illustrating the mechanism of flour-derived carbon formation. The release of gaseous by-products causes in-situ pore formation within the porous mass (see SEM image in FIG. 1)). The reductive gases from the pyrolysis and the presence of carbon may also discourage the oxidation of silicon nanoparticles. Thermogravimetric analysis (TGA) demonstrates that the overall pyrolysis mechanism leads to 70% weight loss of wheat flour (see FIG. 1). The cavities or holes or micron size pores, which are much larger than the silicon particles, in FIG. 1 are referred as "hotel". In the context of this disclosure, the term "hotel" is used to denote the place into which silicon particles can reside. Thus figuratively (or metaphorically), silicon is guest and the pores are hotels. The idea is to keep the silicon "guest" in pore-like "hotel" architecture.

The chemical and material properties of the carbon microstructure enable the effective containment and restraint of Si-NPs. In particular, the carbon architecture is able to minimize the volume expansion of Si-NPs during lithiation, thereby preventing electrode delamination by limiting the cumulative stress applied to the electrode. Furthermore, the carbon matrix can serve as a physical barrier that prevents agglomeration of Si-NPs upon repeated cycling. The addition of a secondary carbon coating to the composite (via a second pyrolysis treatment with additional wheat flour) reduces SEI growth by sheltering Si-NPs from direct contact with electrolyte. This dual-carbon coating process reduces the presence of free Si-NPs on the surface of carbon substrate, and enables a more homogenous distribution of Si-NPs within the primary carbon structure.

Figure 2:
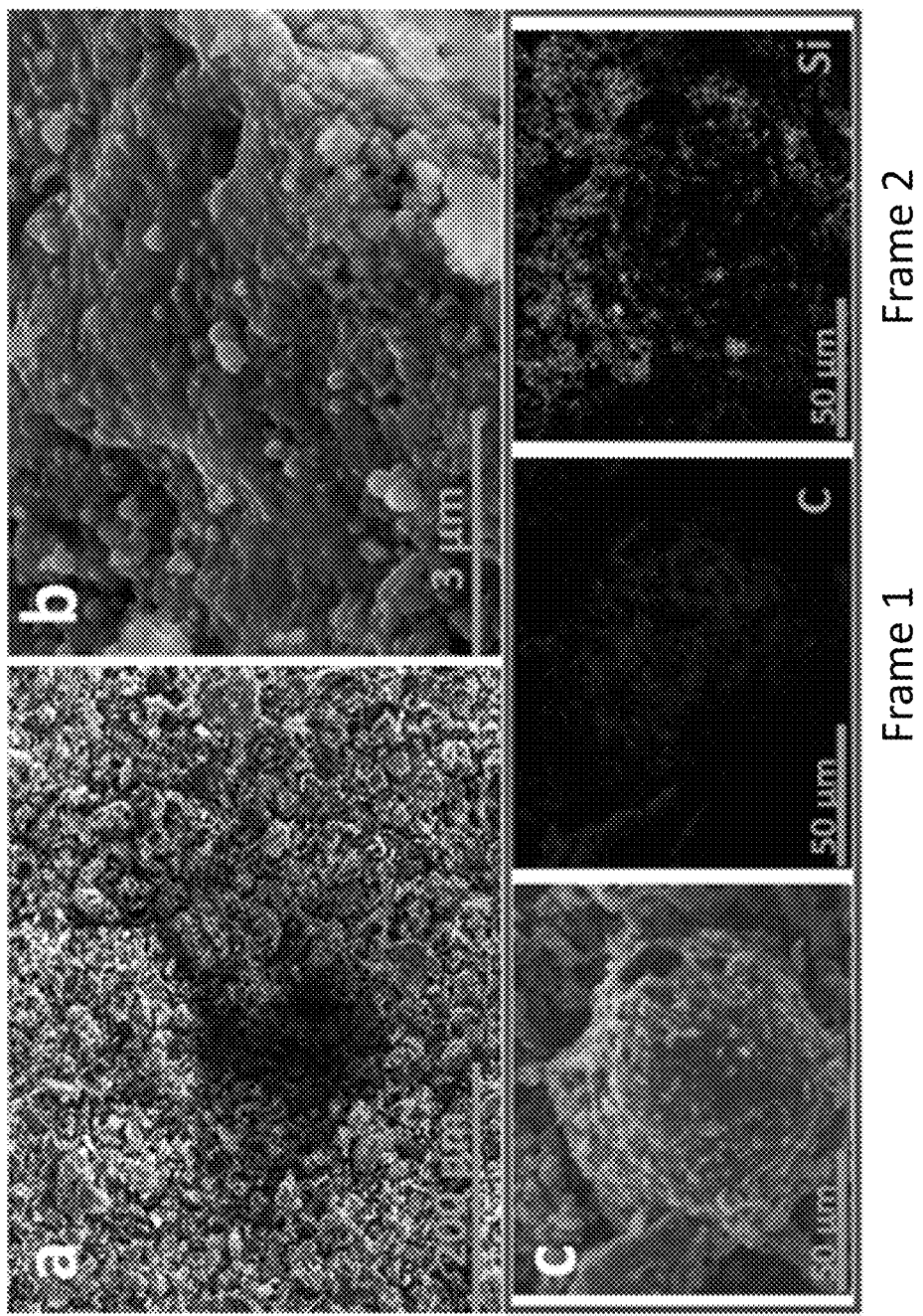
FIG. 2 shows SEM images (in sections a and b) and Energy Dispersive Analysis maps of carbon and silicon, shown in frames labeled frame 1 and frame 2 respectively of the area shown in SEM image C.
Figure 3:
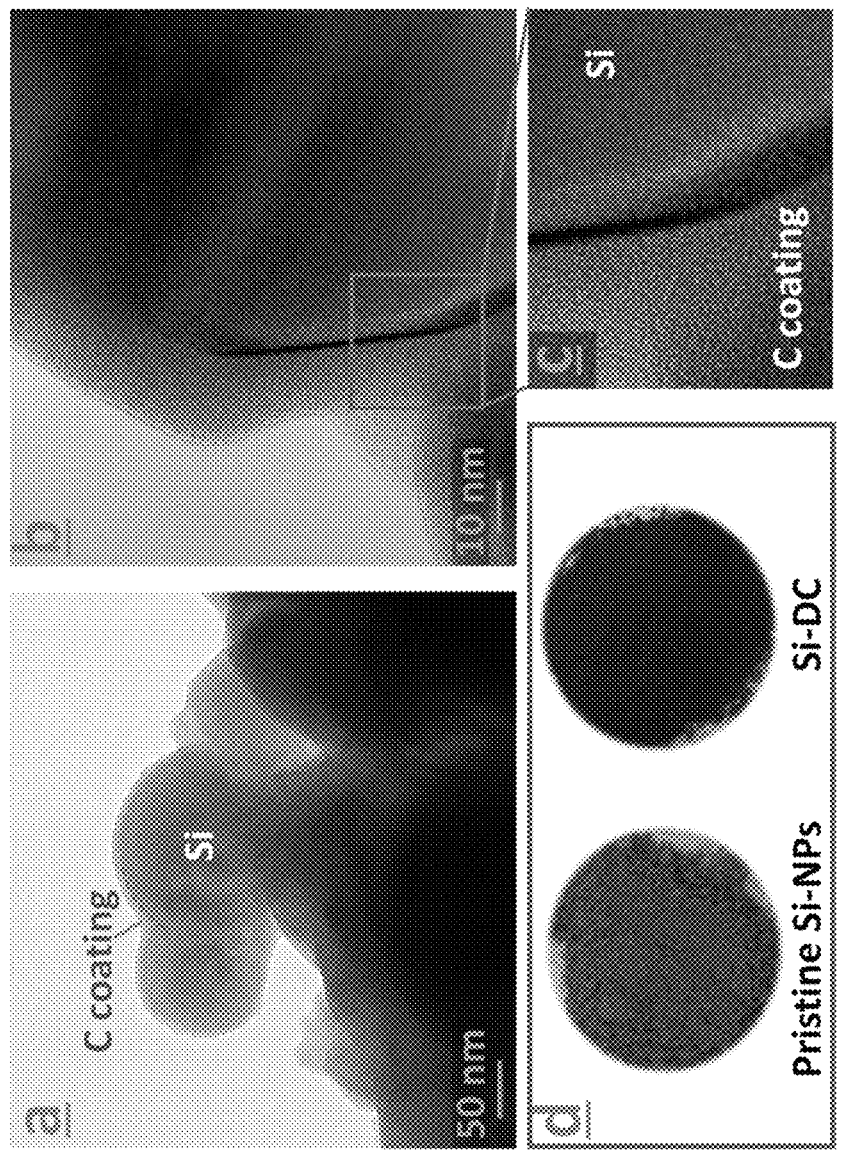
FIG. 3 shows transmission electron microscopy (TEM) images of carbon coating on silicon (sections and b) and visual color difference (in section d) after obtaining the carbon coating (section c)

FIG. 2 shows SEM images (sections marked a and b) and Energy Dispersive Analysis maps of carbon and silicon, shown in frames labeled frame 1 and frame 2 respectively of the area shown in SEM image labeled C. FIG. 3 shows transmission electron microscopy (TEM) images of carbon coating on silicon (sections a and b of FIG. 3) and visual color difference (in section d of FIG. 3) after obtaining the carbon coating (section C). In this disclosure, the symbol DC is used to signify double coating of carbon and Si-DC to mean silicon nanoparticles double coated with carbon in two steps. As seen in FIG. 2 (sections a and b), the Si-DC composite exhibits a distribution of micron-size particles, with a small quantity of Si-NPs at the particle surface. Energy Dispersive X-ray spectroscopy (EDX) elemental mapping of the composite sample C shown in section C of FIG. 2 also indicates the formation of carbon/silicon composite particles as shown in images labeled frame 1 and frame 2 showing carbon and silicon mapping respectively. In comparison to the mechanically-produced sample by directly ballmilling SiNPs with flour-derived carbon, Si-DC particles also exhibit minimal loose SiNPs on particle surface. Moreover, a closer look of the surface SiNPs via TEM imaging reveals that crystalline SiNPs are covered with amorphous carbon layer as seen in FIG. 3 (sections a-c). A noticeable darkening of sample color in Si-DC also suggests the enclosure of Si-NPs by carbon as seen in FIG. 3 (section d). These observations suggest that the majority of Si-NPs are encased within the carbon compartment pores below the surface of the carbon matrix.

Nitrogen sorption measurements at 77K were conducted for pristine Si-NPs and Si-DC samples. The Brunauer, Emmett, and Teller (BET) surface area of SiNPs is calculated to be 16.3 $m^2$ $g^{-1}$ while that of Si-DC is 2.04 $m^2$ $g^{-1}$ (a value similar to that of commercial anodic graphite). Such reduction in surface area again suggests the effective enclosure of SiNPs by the carbon. The Si-DC sample also exhibits a low total pore volume of 0.007 $cm^3$ $g^{-1}$ with both micropores (32.9% of total pore volume) and mesopores (67.1 vol %) based on non-linear density functional theory (DFT) pore size distribution analysis.

The crystallinity and phase purity of the Si-DC composite are confirmed via Raman spectroscopy and X-ray powder diffraction (XRD). FIGS. 4A and 4B show Raman spectra and XRD spectra respectively of Si-DC samples of this disclosure. As shown in section labeled a in FIG. 4, the sample exhibits five major Raman bands. With reference to the Raman spectra of Si-NPs and pyrolyzed commercial wheat flour, the low frequency bands (i.e., 297, 507, and 927 $cm^{-1}$) of Si-DC derive from silicon lattice stretching while the high frequency peaks (i.e., 1362 and 1594 $cm^{-1}$) are attributed to the characteristic D (disordered) and G (graphitic) peaks of the carbon matrix, respectively. Similar Raman bands for silicon carbon composites have been reported by other groups. The XRD spectrum of Si-DC, shown in section labeled b in FIG. 4, demonstrates excellent agreement with the reference silicon spectrum (PDF #65-1060). As observed in the Raman spectrum, the presence of an amorphous carbon matrix is indicated in the XRD spectrum by the broad intensity peak occurring between 20°-27°. The observation of a semi-crystalline carbon substrate during low temperature pyrolysis is consistent with those reported for similarly produced Si—C composites observed in the literature. Altogether, the absence of additional spectral features in both Raman and XRD characterization confirms the binary composition of crystalline silicon and amorphous carbon in the Si-DC composite.

Figure 5A:
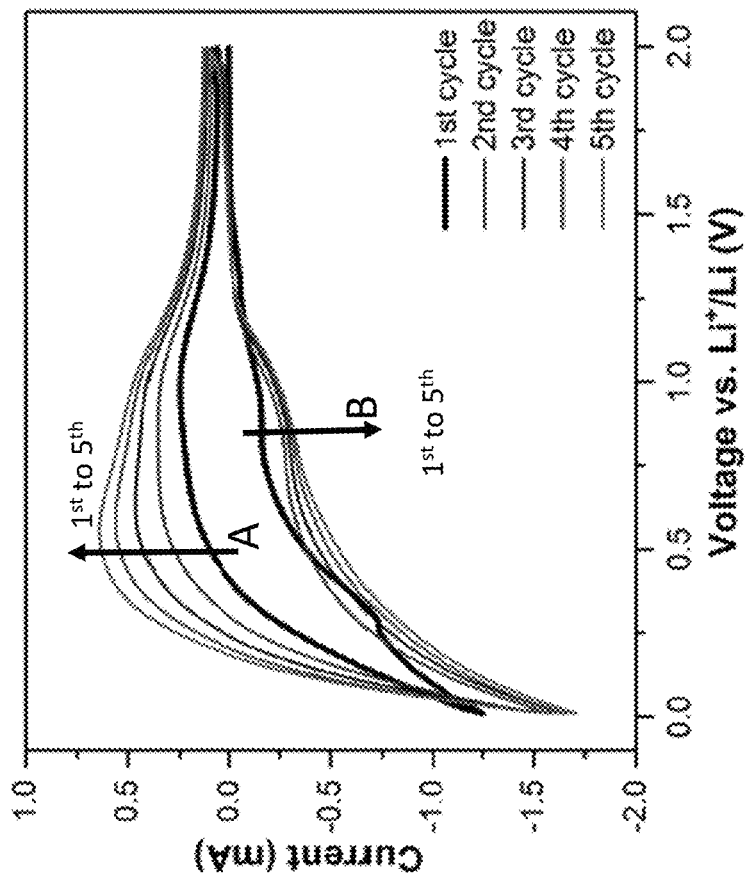
FIG. 5A shows CV curves for the first 5 cycles of Si-DC cells. The arrows in FIG. 5A indicate the order of the curves first cycle to fifth cycle.
Figure 5B:
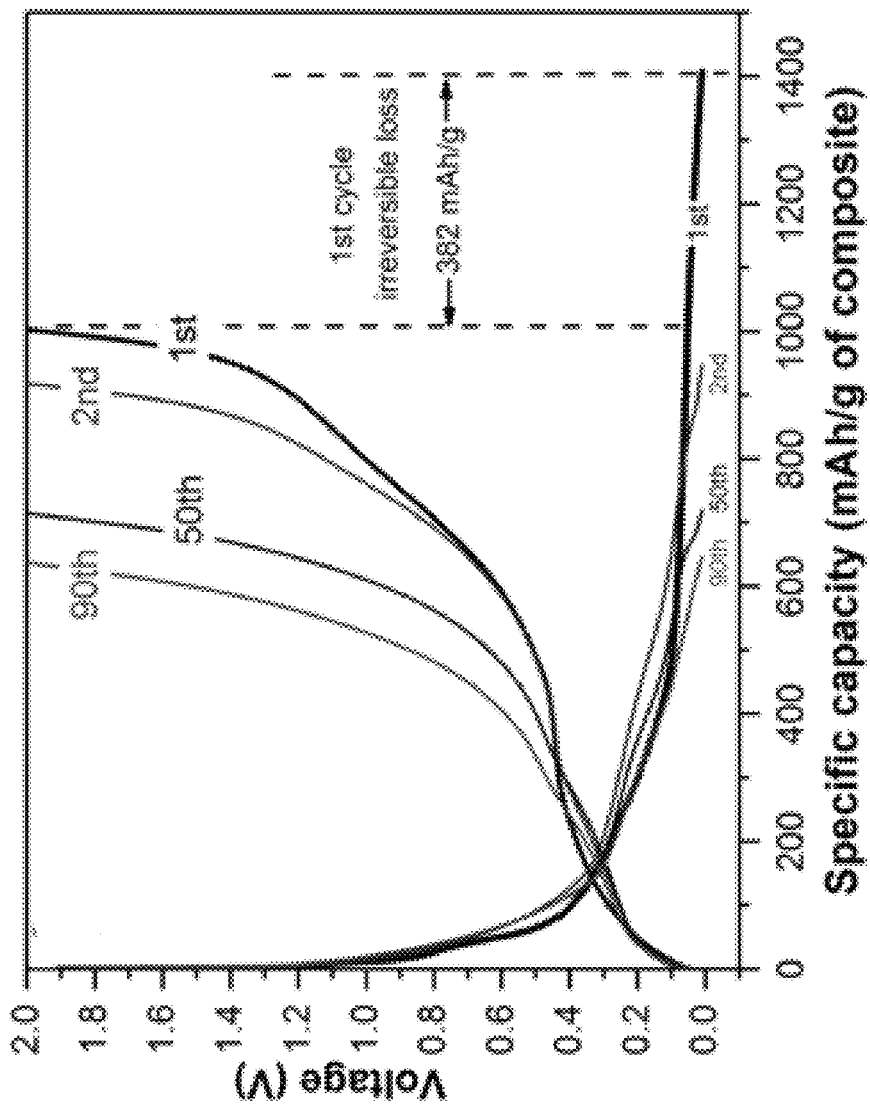
FIG. 5B shows the voltage profile of Si-DC cells.
Figure 5C:
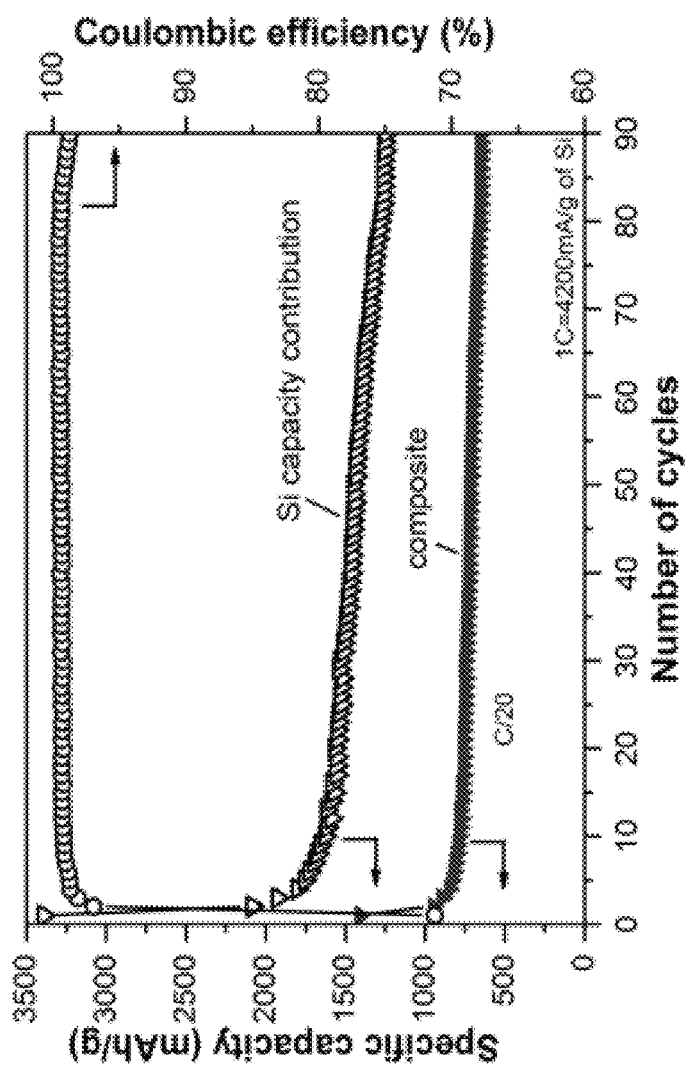
FIG. 5C shows constant current (C/20) cycling of Si-DC cells.

FIGS. 5A through 5C illustrate the electrochemical study of Si-DC cells. FIG. 5A shows CV curves for the first 5 cycles of Si-DC cells. The arrows in FIG. 5A indicate the order of the curves first cycle to fifth cycle. Curves in group labeled A in FIG. 5A refer to de-lithiation of silicon-carbon composite, while the group of curves labeled B refer to lithiation of silicon-carbon composite. Referring to FIG. 5A, cyclic voltammetry analysis of the Si-DC electrode was conducted in a half cell at 1 mV/s from 2V to 10 mV. During the first discharge, the cathodic peaks at 1V and 0.4V are due to the formation of the solid electrolyte interphase (SEI) on the hard carbon surface. The sharp peak below 0.3V is attributed to Si lithiation, which provides the greatest contribution to the measured capacity. In the subsequent second discharge, the disappearance of the cathodic peaks at 1V and 0.4V suggest a stable, unchanging SEI. During the first charge, a broad anodic peak between 0-0.8V is observed. This single peak, centered on 0.4 V, is attributed to the delithiation of the Li—Si alloy; however, this voltammogram feature is not observed in the performance of other Si—C composites previously reported in the literature. Rather, various reports indicate that the typical delithiation mechanism of lithiated silicon occurs via two anodic peaks at 0.3 and 0.5V. It is proposed that the single broad delithiation band is due to diffusion-limited Li-ion transfer into the micron-size particles, leading to an almost step-wise or gradual delithiation mechanism instead of two sharp, distinct peaks. This can be further observed in the voltage-capacity profile of the Si-DC electrode (with a lithium metal reference) illustrated in FIG. 5B, which shows the voltage profile of Si-DC cells, where the primary lithiation of Si-DC begins near 0.3V and continues to the cutoff voltage at 2.0 V. The characteristic delithiation of Si at 0.4V can also be observed. A second anodic peak centered at 1V and overlapping the Si-delithiation peak can be attributed to the delithiation of the carbon.

FIG. 5C shows constant current (C/20) cycling of Si-DC cells. Extended galvanostatic cycling of the Si-DC electrode at cycling rate C/20 (1C=4200 mA $g^{-1}$) is shown of FIG. 5C. Gravimetric capacities are reported on both composite and silicon bases, while the coulombic efficiency is only reported on a composite basis. Referring to FIG. 5C, the cumulative gravimetric capacity of the first discharge cycle is 1264 mAh $g^{-1}$ of composite, and of the first charge is 880 mAh $g^{-1}$ of composite, leads to an irreversible capacity loss of 384 mAh $g^{-1}$ of composite (first cycle CE of 71%). This large irreversible capacity loss is likely due to the initial SEI formation. Following the initial capacity loss, however, the Si-DC electrode demonstrates exceptional stability. The gravimetric capacity stabilizes to ca. 700 mAh $g^{-1}$ composite after the $10^{th}$ cycle, and is maintained at ca. 650 mAh $g^{-1}$ composite after the $90^{th}$ cycle—a capacity retention of ca. 92%. The capacity fade after 90 cycles may be attributed to instability of the lithium metal reference electrode. The high 700 mAh $g^{-1}$ composite capacity delivered by the Si-DC anode is ideal for high energy density applications, even when joined with a lower capacity cathode material (e.g., <200 mAh $g^{-1}$). Extended electrochemical study with a non-metallic reference electrode can also be conducted.

In assessing the stability of the Si-DC anode, it is important to also discuss the capacity performance on a silicon basis. From extended cycling, the mean reversible gravimetric capacity of the Si-NPs is observed to be ca. 1500 mAh g–1 Si. This observed capacity, approximately one third of the theoretical specific capacity of silicon, is expected due to the controlled volumetric expansion of silicon: limitation of the electrochemical lithiation of silicon by the containing or surrounding carbon matrix prevents excessive electrode volume changes that may lead to degradation. Additionally, a voltage cutoff range limited to 10 mV-2V further restricts silicon lithiation and related mechanical stresses, and mitigates excessive SEI growth. The combined result produces a Si—C composite anode that demonstrates greater stability during extended cycling.

Figure 6B:
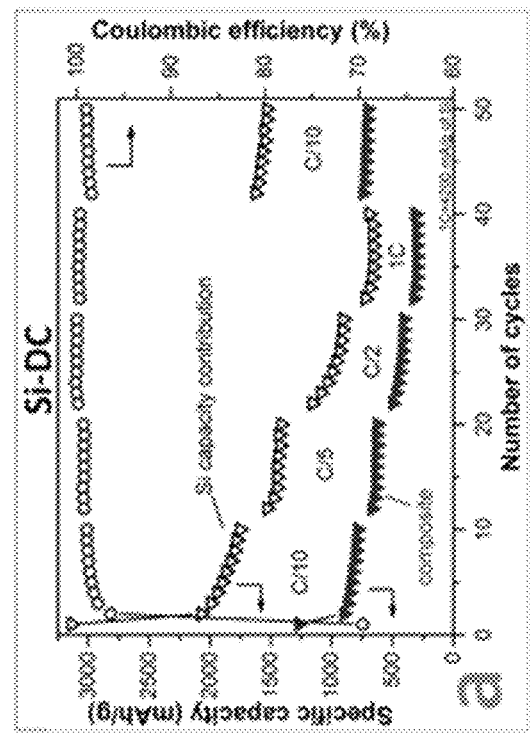
FIGS. 6A and 6B show rate study of Si-DC and Si-control.
Figure 6A:
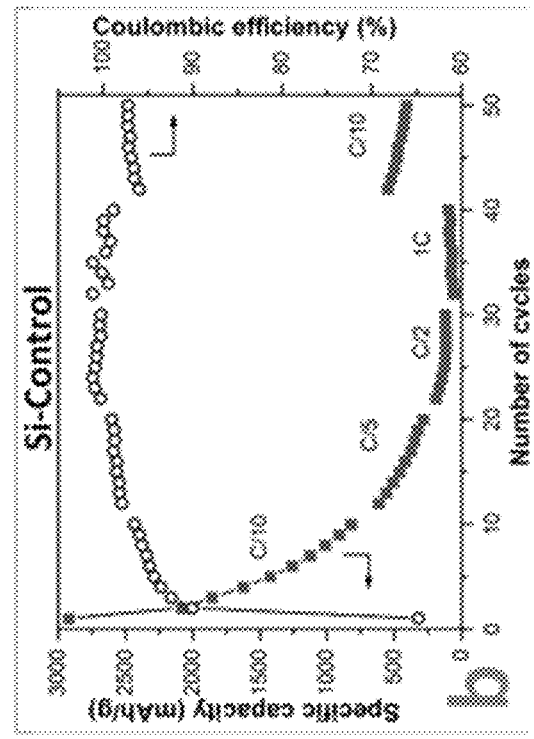

FIGS. 6A and 6B show rate study of Si-DC and Si-control. Referring to FIG. 6A, multi-rate galvanostatic cycling of the Si-DC electrode demonstrates high capacity at various cycling rates between C/10 and 1C. The Si-DC composite delivers excellent gravimetric capacities of 830 mAh$g^{-1}$ composite at C/10, 629 mAh $g^{-1}$ composite at C/5, 420 mAh $g^{-1}$ composite at C/2, and 300 mAh $g^{-1}$ composite at 1C. The corresponding silicon-basis capacities show that Si-NPs are the major contributing component to the composite capacity, delivering ca. 1800 mAh g–1 Si at C/10, and 650 mAh g–1 Si at 1C. In comparison to the Si Control, shown in FIG. 6B, Si-DC composite demonstrates higher and more stable capacities, especially at faster cycling rates. Much like the dual-carbon coated Si-DC composite, the Si Control initially delivers a high capacity of ca. 3000 mAh g–1 Si during the first 5 cycles. However, the Si Control displays a steeper capacity fades to 100 mAh g–1 Si at 1C.

Figures 6C, 6D, 6E, 6F:
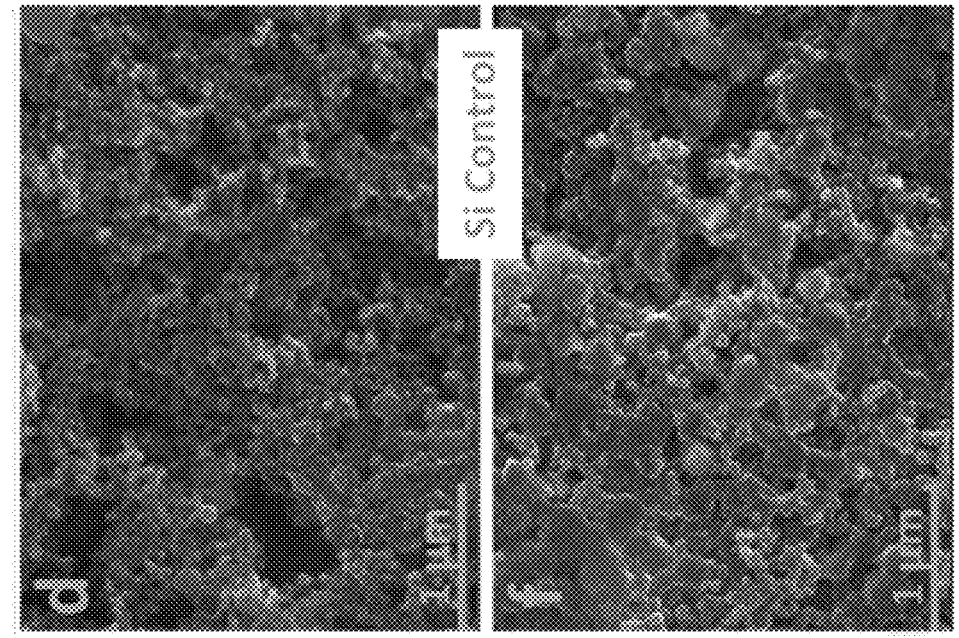
FIGS. 6C and 6D SEM images of the electrodes before cycling.
FIGS. 6E and 6F show SEM images of the electrodes after cycling.

FIGS. 6C through 6F show SEM images of the electrodes before cycling (FIGS. 6C and 6D) and after cycling (FIGS. 6E and 6F). FIG. 6C refers to silicon double carbon before cycling and FIG. 6D refers to Si—C control sample before cycling. FIG. 6C refers to silicon double carbon after cycling and FIG. 6F refers to Si—C control sample after cycling. Post-mortem analysis of the cycled Si-DC and Si Control electrodes shown in FIGS. 6E and 6F respectively, reveal that the dual carbon coating permits a thinner, more stable SEI than the control electrode while maintaining the integrity of microparticles. In comparison to the pristine Si-DC electrode shown in FIG. 6C, the cycled Si-DC electrode shown in FIG. 6E is covered by a thin layer regarded as SEI. Additionally, surface Si-NPs become more visible as a result of prolonged cycling. However, the galvanostatic cycling performance suggests that the overall integrity of the composite particles is maintained for an extended period of time. When compared to the cycled Si-DC electrode, the cycled Si Control reference electrode (FIG. 6F) is covered by a thick SEI-attributed to secondary electrolyte interface buildup—a more dramatic change from its pristine state than that of the Si-DC composite (FIG. 6D). Excessive volumetric expansion and contraction of Si-NPs during cycling deteriorates the once-stable SEI, leading to continual SEI formation on the exposed Si surfaces after each cycle. The continuous capacity fade and poor Coulombic efficiency observed in the Si Control electrode is a consequence of this recurrently-developing buildup (FIG. 6B).

Figure 7:
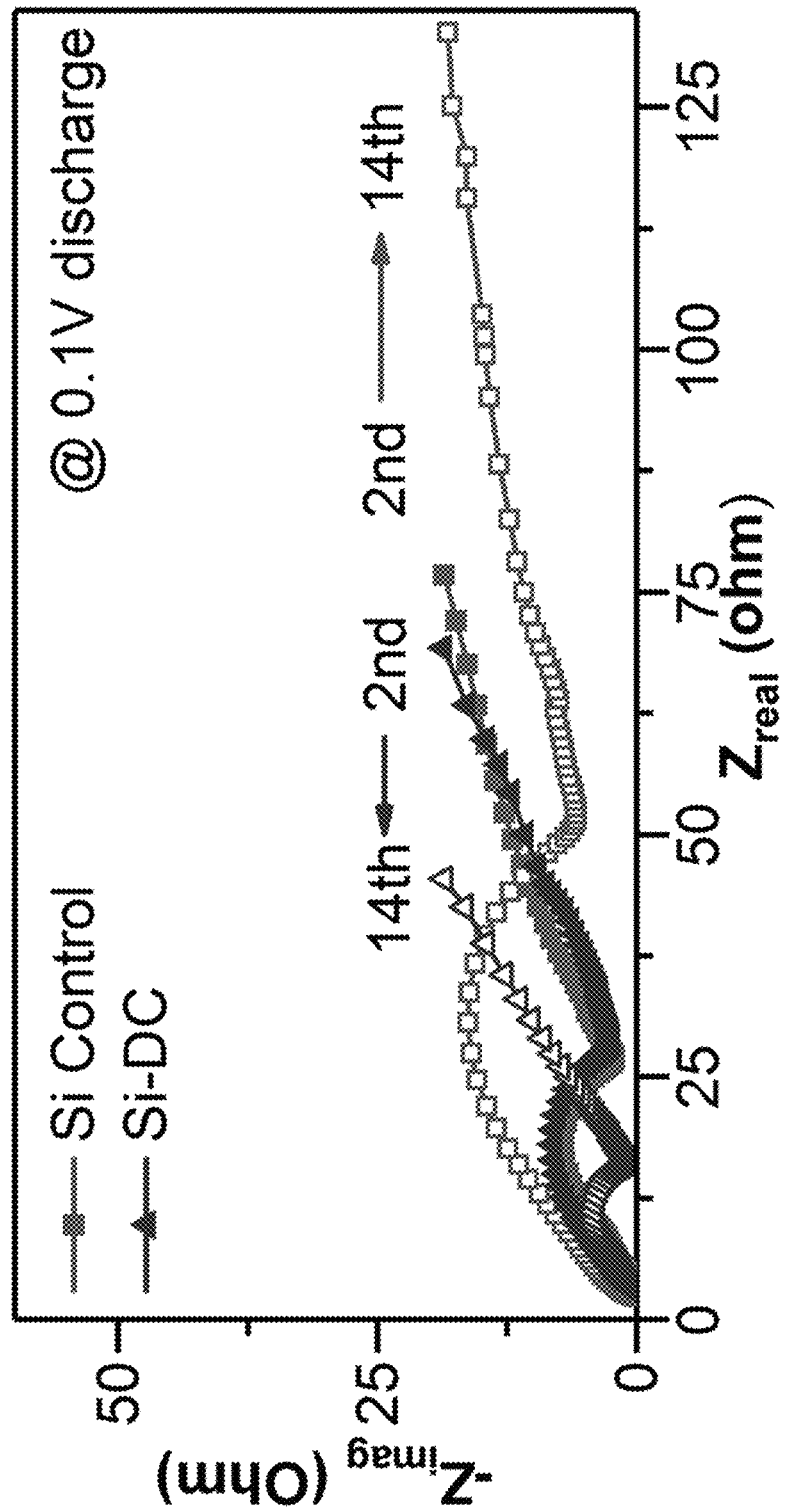
FIG. 7 shows Nyquist plots of Si-Control and Si-DC electrodes at discharge of 0.1V

To further compare their electrochemical behavior, electrochemical impedance spectroscopy (EIS) measurements for both the Si-DC and Si-Control reference electrodes were performed. FIG. 7 shows Nyquist plots of Si-Control and Si-DC electrodes at discharge of 0.1V. Shown via Nyquist plot (FIG. 7)), both Si-DC and the Si Control reference display an electrolyte resistance of ca. 5 ohm (i.e., x-intercept at the high frequency limit) after both the $2^{nd}$ and $14^{th}$ cycles. The combined impedance due to the SEI, charge transfer resistance, and double-layer capacitance (i.e., first circular curve near the high frequency limit is approximately the same for both Si-DC and Si-Control reference after the $2^{nd}$ cycle. However, after the $14^{th}$ cycle, this combined impedance reduces by half that of the second cycle for the Si-DC composite, while the combined impedance is approximately double that of the second cycle for the reference. The increase in impedance of the reference is consistent with the thicker SEI layer observed via SEM after prolonged cycling. Conversely, the significant impedance reduction observed in the Si-DC composite is hypothesized to be a result of the increasing Si/C interfacial contact area after prolonged cycling, which decreases charge transfer resistance. Overall, after the $14^{th}$ cycle, the total impedance of the Si-DC composite is almost 4 times less than that of the Si-Control electrode, suggesting the superior electrochemical stability provided by the dual carbon coating.

In terms of electrochemical performance, the initial CE (71%) and reversible capacities (700 mAh g–1 of composite or 1500 mAh g–1 of Si) of Si-DC anodes fall within upper range of the reported values (CE: 55.7-85% and reversible capacities: 453.5-1215.2 mAh g–1). From the perspective of material synthesis, Si-DC composite is considerably easy to implement in comparison to complex preparations involving chemical etching, electrospinning, and supercritical fluid assisted bio-templating. Future synthesis optimization via controlling flour moisture content, number of coating layers, and pyrolysis temperature should yield Si-DC composites with improved microstructures (fine-tuned porosity to accommodate silicon expansion and optimal silicon loading), hence achieving better electrochemical performance.

Thus in this present disclosure, Micrometer Si-DC particles were successfully synthesized via a facile, inexpensive, scalable dual carbon coating process. The second heat treatment of the Si—C composite with wheat flour serves as an effective and scalable containment strategy to produce a secondary carbon-coated particle. Indeed, characterization of these Si-DC particles demonstrate the presence of Si-NPs below, not above, the surface of the micrometer porous carbon substrate. Galvanostatic electrochemical study of Si-DC electrodes found that Si-DC can deliver a stable capacity of 700 mAh $g^{-1}$ of composite (ca. 1500 mAh $g^{-1}$ Si) at C/20 rate for 90 cycles with minimal capacity fade. The Si-DC composite also exhibits high specific capacities across several rates (830 mAh $g^{-1}$ composite at C/10, 300 mAh $g^{-1}$ composite at 1C). In comparison to the Si-Control electrode without intentional carbonaceous encapsulation, the Si-DC electrode is able to maintain mechanical integrity and forms a thinner SEI with improved charge transfer abilities after prolonged cycling (i.e., near full-lithiation after 14 cycles). This disclosure concludes that biomass-derived carbon-silicon composites, utilizing a second pyrolytic heat treatment to produce a carbonaceous particle outer layer, can be utilized to effectively encapsulate Si-NPs and restrain Si lithiation side effects to improve long-term cycling performance.

It should be noted that a third or further pyrolytic treatment to produce further carbonaceous coating may be needed in some cases to ensure complete encapsulation of the silicon nanoparticles with carbon.

Based on the above experimental results and discussion, it is an objective of this disclosure to describe an anode for use in lithium-ion battery. The anode includes silicon nanoparticles; a coating of carbon on the silicon nanoparticles; and a polymeric binder. The silicon nanoparticles contained in the anode are in a non-limiting size range 50-100 nm. Further, in the anode, thickness coating of carbon particles is in the non-limiting range of 5-25 nm. A non-limiting example of the polymer binder included in the anode contains Styrene butadiene rubber (SBR) and carboxymethyl cellulose (CMC). In one non-limiting embodiment of the anode, the weight percent of Styrene butadiene rubber (SBR) in the polymer binder is approximately 3.0 weight percent. In one non-limiting embodiment of the anode, the weight percent of carboxymethyl cellulose (CMC) is approximately 7.0 weight percent.

Based on the above experimental results and discussion, it is another objective of this disclosure to describe a method of making an anode for use in lithium-ion battery. The method includes providing silicon nanoparticles. A non-limiting range for the size of the silicon nanoparticles is 50-100 nm. The silicon nanoparticles are then mixed with wheat flour to form a homogenized mixture of wheat flour and silicon nanoparticles. In one embodiment of the method, the mixing the silicon nanoparticles with wheat flour is by ball milling. A non-limiting range for the particle size of the wheat flour is in the range of 5 micrometers to 200 micrometers. The homogenized mixture of wheat flour and silicon nanoparticles is then heated for a period of time in an inert atmosphere to form a silicon-carbon composite comprising a coating of carbon on the silicon nanoparticles. A non-limiting range for such heating the heating is in the temperature range of 500° C. to 1000° C. The inert atmosphere can be, but not limited to, argon or nitrogen. A non-limiting range for this period of time can is 2-24 hours. The silicon-carbon composite thus formed comprising a coating of carbon on the silicon nanoparticles is then heated along with an additional quantity of wheat flour in an inert atmosphere resulting in an anode comprising silicon-carbon composite with a double coating on the silicon nanoparticles. The ranges for the heating temperature, atmosphere and heating times for this second coating are very similar to those employed during obtaining the first coating of carbon on the silicon nanoparticles. The silicon-carbon composite with a double coating formed on the on the silicon nanoparticles is then with a polymeric binder, resulting in an anode for use in a lithium battery. An example of a polymer binder suitable for this purpose comprises Styrene butadiene rubber (SBR), carboxymethyl cellulose (CMC). In one embodiment of the method, the weight percent of Styrene butadiene rubber (SBR) in the polymer binder is approximately 3.0 weight percent. In one embodiment of the method, the weight percent of carboxymethyl cellulose (CMC) in the polymer binder is approximately 7.0 weight percent.

It is yet another objective of this disclosure to describe an electrochemical cell containing an anode, a cathode and an electrolyte, wherein the anode comprises silicon nanoparticles, a coating of carbon on the silicon nanoparticles; and a polymeric binder. In some embodiments of the electrochemical cell of this disclosure, the silicon nanoparticles are in the size range 50-100 nm. In some embodiments of the electrochemical cell of this disclosure, thickness of the coating of carbon particles is in the range of 5-25 nm. In some embodiments of the electrochemical cell of this disclosure, the polymer binder comprises styrene butadiene rubber (SBR) and carboxymethyl cellulose (CMC). In some embodiments of the electrochemical cell of this disclosure employing a polymer binder containing styrene butadiene rubber (SBR) and carboxymethyl cellulose (CMC), the weight percent of Styrene butadiene rubber (SBR) is approximately 3.0 weight percent. In some embodiments of the electrochemical cell of this disclosure employing a polymer binder containing styrene butadiene rubber (SBR) and carboxymethyl cellulose (CMC).

It should be recognized that while several embodiments of this disclosure refer to double coating of carbon, it is possible to 1) refer to the double coating as "a coating of carbon" for simplicity 2) have more than two coatings by adopting the methods described above to achieve one, two or more than two coatings. 3) It is possible to have anodes and electrochemical cells with anodes which have just one simple coating of carbon (i.e. that is without the double or multiple coatings describe hitherto.

While the present disclosure has been described with reference to certain embodiments, it will be apparent to those of ordinary skill in the art that other embodiments and implementations are possible that are within the scope of the present disclosure without departing from the spirit and scope of the present disclosure. It is therefore intended that the foregoing detailed description be regarded as illustrative rather than limiting. Thus, this disclosure is limited only by the following claims.

The invention claimed is:

1. An anode for use in lithium-ion battery, the anode comprising:
   a silicon-carbon composite containing silicon nanoparticles encased with carbon in pores below a surface of a carbon matrix of the silicon-carbon composite;
   two or more coatings of carbon on the silicon-carbon composite; and
   a polymeric binder,
   wherein the silicon nanoparticles are crystalline, and the carbon matrix and the two or more coatings of carbon are amorphous, and wherein the silicon nanoparticles encased with carbon are interconnected through the two or more coatings of carbon, wherein complete encasement of silicon nanoparticles with carbon is achieved by three or more pyrolytic treatments of the two or more carbon coatings, wherein the silicon-carbon composite has micron-size particles with silicon nanoparticles at surface of the micron-size particles, and wherein the anode contains micropores and mesopores resulting in total pore volume of 0.007 cm3 g−1.

2. The anode of claim 1, wherein the silicon nanoparticles are in a size range 50-100 nm.

3. The anode of claim 1, wherein thickness of the coating of carbon is in a range of 5-25 nm.

4. The anode of claim 1, wherein the polymer binder comprises styrene butadiene rubber (SBR) and carboxymethyl cellulose (CMC).

5. The anode of claim 4, wherein a weight percent of styrene butadiene rubber (SBR) is approximately 3.0 weight percent.

6. The anode of claim 4, wherein a weight percent of carboxymethyl cellulose (CMC) is approximately 7.0 weight percent.

7. An electrochemical cell containing an anode, a cathode and an electrolyte, wherein the anode comprises a silicon-carbon composite containing silicon nanoparticles encased with carbon in pores below a surface of a carbon matrix of the silicon-carbon composite, one two or more coatings of carbon on the silicon-carbon composite, and a polymeric binder, wherein the silicon particles are crystalline, and the carbon matrix and the one or more coatings of carbon are amorphous and wherein the silicon nanoparticles encased with carbon are interconnected through the two or more coatings of carbon and wherein complete encasement of silicon nanoparticles with carbon is achieved by three or more pyrolytic treatments of the two or more carbon coatings, wherein the silicon-carbon composite has micron-size particles with silicon nanoparticles at surface of the micron-size particles, and wherein the anode contains micropores and mesopores resulting in total pore volume of 0.007 cm3 g−1.

8. The electrochemical cell of claim 7, wherein the silicon nanoparticles are in a size range 50-100 nm.

9. The electrochemical cell of claim 7, wherein thickness of the coating of carbon is in a range of 5-25 nm.

10. The electrochemical cell of claim 7, wherein the polymer binder comprises Styrene butadiene rubber (SBR) and carboxymethyl cellulose (CMC).

11. The electrochemical cell of claim 10, wherein a weight percent of Styrene butadiene rubber (SBR) is approximately 3.0 weight percent.

12. The electrochemical cell of claim 10, wherein a weight percent of carboxymethyl cellulose (CMC) is approximately 7.0 weight percent.

13. The electrochemical cell of claim 7, wherein the electrochemical cell is a Li-ion battery.

* * * * *